United States Patent
Zhou et al.

(10) Patent No.: US 10,341,594 B2
(45) Date of Patent: Jul. 2, 2019

(54) LIGHT FIELD CAPTURE CONTROL METHODS AND APPARATUSES, LIGHT FIELD CAPTURE DEVICES

(71) Applicant: BEIJING ZHIGU TECH CO., LTD., Beijing (CN)

(72) Inventors: Liang Zhou, Beijing (CN); Lin Du, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 5 days.

(21) Appl. No.: 15/510,803

(22) PCT Filed: Aug. 26, 2015

(86) PCT No.: PCT/CN2015/088111
§ 371 (c)(1),
(2) Date: Mar. 13, 2017

(87) PCT Pub. No.: WO2016/041432
PCT Pub. Date: Mar. 24, 2016

(65) Prior Publication Data
US 2017/0257588 A1  Sep. 7, 2017

(30) Foreign Application Priority Data
Sep. 15, 2014  (CN) .......................... 2014 1 0469325

(51) Int. Cl.
*H04N 5/369* (2011.01)
*H04N 5/232* (2006.01)

(52) U.S. Cl.
CPC .......... *H04N 5/3696* (2013.01); *H04N 5/232* (2013.01); *H04N 5/23235* (2013.01)

(58) Field of Classification Search
CPC ... H04N 5/3696; H04N 5/23235; H04N 5/232
(Continued)

(56) References Cited

U.S. PATENT DOCUMENTS

2006/0119903 A1*  6/2006  Chiba ............... H04N 5/23212
358/474
2006/0256227 A1  11/2006  Gotzig
(Continued)

FOREIGN PATENT DOCUMENTS

CN  1792089 A  6/2006
CN  102314683 A  1/2012
(Continued)

OTHER PUBLICATIONS

International Search Report and Written Opinion for Application No. PCT/CN2015/088111, dated Oct. 21, 2015, 10 pages.

*Primary Examiner* — Yogesh K Aggarwal
(74) *Attorney, Agent, or Firm* — Sheppard Mullin Richter & Hampton LLP

(57) ABSTRACT

Embodiments of the subject application disclose various light field capture control methods and apparatuses and various light field capture devices, wherein one light field capture control method comprises: acquiring depth information of a to-be-shot scene; determining target pixel density distribution information of an image sensor of a light field camera according to the depth information; adjusting pixel density distribution of the image sensor according to the target pixel density distribution information; and performing, by the adjusted image sensor, light field capture of the to-be-shot scene. The technical solution provided in the embodiments of the subject application can make full use of overall pixels of the image sensor of the light field camera to unevenly record light field information of different regions of the to-be-shot scene in a depth of field (DOF) direction, thereby improving light field capture efficiency.

20 Claims, 10 Drawing Sheets

(58) Field of Classification Search
USPC .................................................. 348/294–324
See application file for complete search history.

(56) References Cited

U.S. PATENT DOCUMENTS

| | | |
|---|---|---|
| 2008/0151089 A1 | 6/2008 | Street et al. |
| 2011/0310125 A1* | 12/2011 | McEldowney .......... G06F 3/017 345/660 |
| 2013/0120356 A1 | 5/2013 | Georgiev et al. |
| 2014/0049666 A1 | 2/2014 | Tsutsumi |
| 2014/0147050 A1 | 5/2014 | S V et al. |
| 2014/0168371 A1 | 6/2014 | Chang |
| 2014/0219575 A1* | 8/2014 | Govindarao ............ G06T 5/005 382/255 |
| 2014/0253760 A1 | 9/2014 | Watanabe et al. |
| 2016/0134807 A1 | 5/2016 | Tsutsumi |

FOREIGN PATENT DOCUMENTS

| | | |
|---|---|---|
| CN | 102739945 A | 10/2012 |
| CN | 103595979 A | 2/2014 |
| CN | 103838568 A | 6/2014 |
| CN | 104038690 A | 9/2014 |
| CN | 104159038 A | 11/2014 |
| CN | 104243823 A | 12/2014 |
| CN | 104301605 A | 1/2015 |
| CN | 104469147 A | 3/2015 |
| JP | 2006129411 A | 5/2006 |
| JP | 2014039119 A | 2/2014 |

* cited by examiner

LIGHT FIELD CAPTURE CONTROL METHODS AND APPARATUSES, LIGHT FIELD CAPTURE DEVICES

CROSS-REFERENCE TO RELATED APPLICATIONS

This application is a national phase application of International Application No. PCT/CN2015/088111, filed on Aug. 26, 2015, which claims the benefit of priority to Chinese Patent Application No. 201410469325.4, filed on Sep. 15, 2014, and entitled "Light Field Capture Control Methods and Apparatuses, Light Field Capture Devices", each of which is incorporated by reference herein in its entirety.

TECHNICAL FIELD

The subject application relates to the field of light field capture technologies, and in particular, to various light field capture control methods and apparatuses and various light field capture devices.

BACKGROUND

A light field camera is an imaging technology that uses a sub-lens array to record and reproduce a three-dimensional scene, which usually places a sub-lens array between a main lens and an image sensor such as CCD, and records, through the sub-lens array, light field information of different directions of a three-dimensional scene on a focal plane of the sub-lens array.

Distinguished from the two-dimensional image capture manner of the traditional camera, the light field camera can record four-dimensional light field information (such as space and views) of a three-dimensional scene through single exposure, supports "first shoot and then focus" (i.e., focusing is not necessary during shooting), can generate rich image effects by processing shot images, and can meet multiple imaging applications, for example, digital re-focusing, change of view, depth images, three-dimensional reconstruction, all-in-focus images and the like.

SUMMARY

A brief summary about the subject application is given hereinafter, so as to provide a basic understanding about certain aspects of the subject application. It should be understood that the summary is not an exhaustive summary about the subject application. It is neither intended to determine critical or important parts of the subject application, nor intended to limit the scope of the subject application. Its purpose is merely giving some concepts in a simplified form, to be taken as the preamble to be described later in more detail.

The subject application provides embodiments of various light field capture control methods and apparatuses and various light field devices.

In one aspect, an embodiment of the subject application provides a light field capture control method, comprising:
 acquiring depth information of a to-be-shot scene;
 determining target pixel density distribution information of an image sensor of a light field camera according to the depth information;
 adjusting pixel density distribution of the image sensor according to the target pixel density distribution information; and
 performing, by the adjusted image sensor, light field capture of the to-be-shot scene.

In another aspect, an embodiment of the subject application further provides a light field capture control apparatus, comprising:
 a scene depth information capture module, configured to acquire depth information of a to-be-shot scene;
 a target pixel density distribution information determination module, configured to determine target pixel density distribution information of an image sensor of a light field camera according to the depth information;
 a pixel density distribution adjustment module, configured to adjust pixel density distribution of the image sensor according to the target pixel density distribution information; and
 a light field capture module, configured to perform light field capture of the to-be-shot scene via the adjusted image sensor.

In a further aspect, an embodiment of the subject application provides a light field capture device, comprising a light field camera and the light field capture control apparatus, the light field capture control apparatus being connected with the light field camera.

The technical solution provided in the embodiments of the subject application determines target pixel density distribution information of an image sensor of a light field camera according to the depth information, adjusts pixel density distribution of the image sensor according to the target pixel density distribution information, and performs light field capture of the to-be-shot scene via the adjusted image sensor, which can make full use of overall pixels of the image sensor of the light field camera to unevenly record light field information of different regions of the to-be-shot scene in a depth of field (DOF) direction, to cause richness of the light field information of different regions of the scene in the DOF direction recorded by the light field images acquired to be different, thereby improving light field capture efficiency and meeting actual application demands of, for example, improving sharpness of all-in-focus images of a local region of the to-be-shot scene.

These and other advantages of the subject application will be more evident through the following detailed description about optional embodiments of the subject application with reference to the accompanying drawings.

BRIEF DESCRIPTION OF THE DRAWINGS

The subject application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the subject application and explain the principle and advantages of the subject application. In the drawings.

Figure 1A:
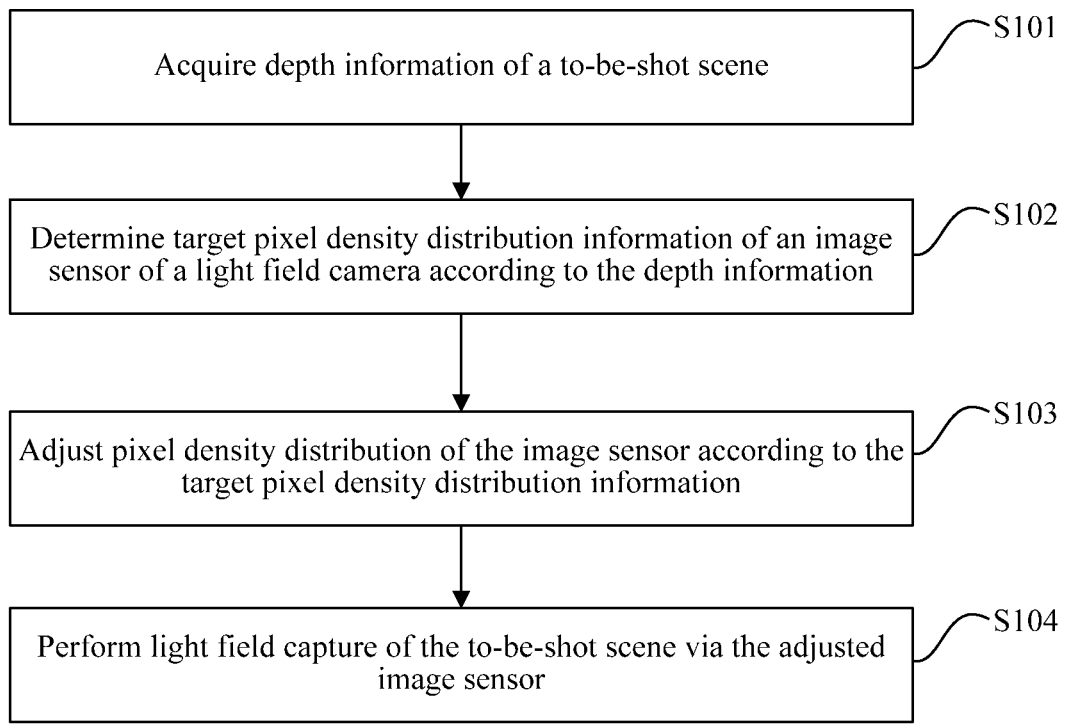
FIG. 1a is a flowchart of a light field capture control method according to one embodiment of the subject application.

Those skilled in the art should understand that, elements in the drawings are merely illustrated for the sake of simplicity and clarity, and may not be drawn to scale. For example, sizes of certain elements in the drawings may be amplified relative to other elements, so as to help to improve the understanding about the embodiments of the subject application.

DETAILED DESCRIPTION

Exemplary embodiments of the subject application are described below in detail with reference to the accompanying drawings. For the sake of clarity and simplicity, not all the features of actual implementations are described in the specification. However, it should be understood that, lots of decisions specific to implementations must be made during development of any such actual embodiment, so as to achieve specific goals of developers, for example, restrictions relevant to systems and services are met, and the restrictions may vary with different implementations. In addition, it should also be understood that, although development work is likely to be very complicated and time-consuming, for those skilled in the art who benefit from the disclosure, the development work is merely a routine task.

Herein, it should also be noted that, in order to avoid blurring the subject application due to unnecessary details, only apparatus structures and/or processing steps closely related to solutions according to the subject application are described in the accompanying drawings and the specification, but representation and description about members and processing having little to do with the subject application and known to those of ordinary skill in the art are omitted.

Specific implementations of the subject application are described in detail hereinafter with reference to the accompanying drawings and embodiments (in which the same elements are denoted by the same reference numerals). The following embodiments are intended to describe the subject application, but not to limit the scope of the subject application.

It should be understood by those skilled in the art that the terms such as "first" and "second" in the subject application are merely intended to distinguish different steps, devices or modules, etc., which neither represent any particular technical meaning nor indicate a necessary logical sequence between them.

The inventor of the subject application has found in the process of implementing the embodiments of the subject application that, generally, when light field capture of a to-be-shot scene is performed based on a light field camera, pixels of an image sensor are evenly distributed, and richness (e.g., image spatial resolution and/or angular resolution) of light field information of respective regions in different depths of the scene acquired based on the image sensor is the same. If a local region, in which a user or device is interested, in the scene has certain depth distribution in a DOF direction of the to-be-shot scene, re-focused images of different DOF depths of the local region can be acquired according to light field images of the scene acquired through one shot, and the re-focused images are synthesized into an all-in-focus image of the local region within a certain DOF range. However, in some scenes, different regions of the scene usually have different meanings and/or significance for users, that is, a user or device is more interested in a local region, corresponding to the all-in-focus image, of the scene is higher than in other regions of the scene, and there are higher requirements for imaging quality such as sharpness of the all-in-focus image of the local region. To this end, the embodiments of the present invention provide a light field capture control method, which can make full use of overall pixels of the image sensor of the light field camera to unevenly record light field information of different regions of the to-be-shot scene in a DOF direction, to improve light field capture efficiency and meet actual application demands of, for example, improving sharpness of all-in-focus images of a local region of the to-be-shot scene.

FIG. 1a is a flowchart of a light field capture control method according to one embodiment of the subject application. An execution body of the light field capture control method according to the embodiment of the subject application may be a certain light field capture control apparatus, and the light field capture control apparatus may perform static or dynamic light field capture control by executing the light field capture control method during applications, which comprise, but are not limited to, phototaking, camera shooting, photographing and video monitoring. Device manifestations of the light field capture control apparatus are not limited, for example, the light field capture control apparatus may be a certain separate component, and the component cooperates with the light field camera for communications; or the light field capture control apparatus may be integrated, as a certain functional module, into an image capture device comprising a light field camera, which is not limited in the embodiment of the subject application.

Specifically, as shown in FIG. 1a, a light field capture control method provided in the embodiment of the subject application comprises:

S101: Acquire depth information of a to-be-shot scene.

The to-be-shot scene is a three-dimensional scene. The depth information of the to-be-shot scene may comprise, but is not limited to, a depth map of the to-be-shot scene. The manner of acquiring depth information of the to-be-shot scene is not limited, for example, the depth map of the to-be-shot scene may be acquired from light field information acquired by a traditional light field camera or acquired by using a depth sensor or through shooting of a multi-view camera or other methods.

S102: Determine target pixel density distribution information of an image sensor of a light field camera according to the depth information.

The light field camera generally comprises a main lens, a sub-lens array and an image sensor disposed in sequence, and the sub-lens array comprises multiple array-distributed sub-lenses. Light rays from different directions of different object points of the to-be-shot scene are converged onto at least one sub-lens of the sub-lens array via the main lens, the light rays converged by the main lens are separated via the at least one sub-lens, the separated light rays record light intensity, direction and other information through the image sensor, thus acquiring imaging information (i.e., light field information) of multiple view directions of the to-be-shot scene, and the acquired light field information can manifest as multiple parallax images interleaved, which might as well be called light field images.

The target pixel density distribution information of the image sensor determined according to the depth information is generally configured to represent a user's or device's differential expectation for richness of capture of light field information of different regions of the to-be-shot scene in a DOF direction, and the richness of capture of light field information may manifest as, but is not limited to, differences of image spatial resolution and/or angular resolution of sub-images, corresponding to respective regions, in the light field images.

S103: Adjust pixel density distribution of the image sensor according to the target pixel density distribution information.

After the depth information of the to-be-shot scene is acquired, target pixel density distribution information of the image sensor can be determined according to the depth information, to cause target pixel density of respective imaging regions, corresponding to light field capture of different regions of the to-be-shot scene in a DOF direction, of the adjusted image sensor to be different.

The image sensor in the embodiment of the subject application is an image sensor with adjustable pixel density, which may comprise, but not limited to, a flexible image sensor, and the flexible image sensor comprises a flexible substrate and multiple image sensor pixels formed on the flexible substrate, wherein the flexible substrate, when meeting a certain condition, may adjust pixel density distribution thereof through expansion and contraction, bending or other changes. In combination with the characteristic that the pixel density distribution of the image sensor is adjustable, the embodiment of the subject application adjusts pixel density distribution of the image sensor according to the target pixel density distribution information, to cause pixel density distribution of the adjusted image sensor to correspond to the target pixel density distribution information, or cause pixel density distribution of the adjusted image sensor to get the target pixel density distribution information as close as possible, so as to unevenly record light field information of different regions of the to-be-shot scene in a DOF direction through the adjusted image sensor.

S104: Perform light field capture of the to-be-shot scene via the adjusted image sensor.

Pixel density of respective imaging regions, corresponding to light field capture of different regions of the to-be-shot scene in a DOF direction, of the adjusted image sensor is different, therefore, in light field images obtained through light field capture on the to-be-shot scene via the adjusted image sensor, richness of light field information of sub-images of different regions of the to-be-shot scene in a DOF direction varies, for example, richness of light field information of a sub-image, corresponding to a region in which a user or device is more interested in the DOF direction of the to-be-shot scene, of the light field images is higher, while richness of light field information of a sub-image, corresponding to other regions except the region of interest, of the light field images is lower.

The technical solution provided in the embodiment of the subject application determines target pixel density distribution information of an image sensor of a light field camera according to the depth information, adjusts pixel density distribution of the image sensor according to the target pixel density distribution information, and performs light field capture of the to-be-shot scene via the adjusted image sensor, which can make full use of overall pixels of the image sensor of the light field camera to unevenly record light field information of different regions of the to-be-shot scene in a DOF direction, to cause richness of the light field information of different regions of the scene in the DOF direction recorded by the light field images acquired to be different, thereby improving light field capture efficiency. If light field information of a local region of the scene recorded is richer, it facilitates acquiring re-focused images, with higher sharpness and different DOFs, of the local region based on the light field images of the scene to further acquire an all-in-focus image of the local region within a certain DOF range, which thus improving sharpness of the all-in-focus image of the local region and improving user experience.

Optionally, the determining target pixel density distribution information according to the depth information comprises: performing regional division on the to-be-shot scene in a DOF direction according to the depth information; and determining the target pixel density distribution information according to a result of the regional division, wherein in the target pixel density distribution information, target pixel density distribution corresponding to at least two different regions divided varies. The "target pixel density distribution varies" indicates that target pixel density distribution of imaging regions configured to record light field information of different regions of the scene is not completely the same, for example, average target pixel density of at least two imaging regions of the image sensor corresponding to at least two different regions is different, or although average target pixel density of at least two imaging regions of the image sensor corresponding to at least two different regions is the same, specific pixel distribution of respective imaging regions is different, and the like. When regional division is performed on the to-be-shot scene, the to-be-shot scene can be divided according to actual needs into multiple local regions, such as a foreground object region, a transition region, and a background object region, and the foreground object or background object may be, but is not limited to, a part of a human body, a building or the like having certain depth distribution in the DOF direction of the scene. According to a result of the regional division, corresponding expected information of richness of capture of light field information can be determined targetedly for respective regions, for example, expectation for richness of light field capture of the foreground object region and/or the background object region is higher than that for richness of light field capture of the transition region, and so on. The expected information may manifest as target pixel density distribution of respective imaging regions of the image sensor configured to record light field information of respective regions, and distribution of respective imaging regions and target pixel density distribution corresponding thereto constitute target pixel density distribution information of the image sensor. Alternatively, average target pixel density of different regions of the to-be-shot scene can gradually change in a regular manner. For example, in some cases, quality of a user's or device's light field capture on scene regions at different distances from a lens of the light field camera is different, therefore, the target pixel density distribution information can be determined according to actual needs, and in the target pixel density distribution information, average target pixel density corresponding to different regions presents gradual change with a regularity along with an increase of DOF depths of the different regions; optionally, with gradual increase of DOF depths of the different regions, average target pixel density corresponding to different regions changes from dense to sparse, that is to say, in the target pixel density distribution information, average target pixel density corresponding to a shallower-DOF region is greater than that corresponding to a deeper-DOF region. The solution can perform regional division on the to-be-shot scene in the DOF direction according to actual needs, and flexibly determines target pixel density distribution of imaging regions, corresponding to respective regions, of the image sensor according to a result of the regional division, which achieves differential capture of light field information of different regions of the to-be-shot scene in the DOF direction on the basis of making full use of overall pixels of the image sensor, and meets diversified actual application demands.

In one optional implementation, the determining the target pixel density distribution information according to a result of the regional division may comprise: determining distribution information of a sub-lens, which affects light field capture of respective regions in the result of the regional division, in a sub-lens array of the light field camera; determining imaging region distribution information of the image sensor corresponding to the distribution information of the sub-lens; and determining the target pixel density distribution information according to the imaging region distribution information, wherein in the target pixel density distribution information, target pixel density distribution corresponding to at least two different imaging regions varies. In a situation where light field capture is performed on the to-be-shot scene based on the light field camera, sub-lenses, which affect light field capture of different regions of the to-be-shot scene, in the sub-lens array of the light field camera are not the same, and imaging regions of the image sensor of the light field camera corresponding to different sub-lenses are different; therefore, distribution information of the sub-lenses which affect light field capture of different regions of the to-be-shot scene and imaging region distribution information of the image sensor corresponding to the distribution information of the sub-lenses can be determined, the target pixel density distribution information is determined according to the imaging region distribution information, so as to make target pixel density distribution of at least two imaging regions in the image sensor not completely the same, thereby re-adjusting pixel density distribution of the image sensor to acquire light field information of different regions of the to-be-shot scene in the DOF direction differently, to increase light field capture efficiency, which can better meet users' diversified actual application demands. In the solution, for an imaging region of the image sensor with greater target pixel density, details of light field information (e.g., information such as light brightness and/or direction) of a local region, having certain depth distribution, of the to-be-shot scene in the DOF direction acquired are richer, and based on light field images shot through single-exposure, a re-focused image of a certain DOF with higher image spatial resolution corresponding to the local region can be acquired, and/or multiple re-focused images corresponding to different DOFs corresponding to the local region can be acquired, to obtain an all-in-focus image with higher image sharpness corresponding to the local region.

In another optional implementation, the determining the target pixel density distribution information according to a result of the regional division comprises: determining target view distribution information of light field capture of the to-be-shot scene according to the result of the regional division; and determining the target pixel density distribution information according to the target view distribution information. In a situation where light field capture is performed on the to-be-shot scene based on the light field camera, re-focusing granularity is usually used to represent a light field sampling frequency of a shot light field image in a DOF direction. The richer light field view information (i.e., light field direction information) of a certain region of the to-be-shot scene in a DOF direction recorded by the image sensor of the light field camera is, the higher the angular resolution of a sub-image, corresponding to the region, of the light field image obtained is. If the angular resolution of the light field image is higher, a re-focused image can be acquired in the DOF direction at a smaller distance, that is to say, the re-focusing granularity is finer. The solution determines target view distribution information of light field capture of the to-be-shot scene according to a result of the regional division of the to-be-shot scene in the DOF direction, a user's or device's differential expectation for richness of capture of light field view information of different regions of the to-be-shot scene in the DOF direction is represented through the target view distribution information, and target pixel density distribution information of the image sensor is determined according to the target view distribution information, to cause light field view information of different regions divided in a DOF direction of the to-be-shot scene to be acquired differently based on the image sensor of which the target pixel density distribution information is adjusted, for a partial region (such as a foreground image region and/or a background image region), in which a user or device is interested, with certain depth distribution in the DOF direction, the acquired light field view information is richer (for example, it records light direction information of a horizontal direction ±5° and a vertical direction ±5° of the partial region and a view step value of 0.5°, and so on), while, for other regions (such as a transition region), the acquired light field view information is less rich (for example, it records light direction information of a horizontal direction ±5° and a vertical direction ±5° of the other regions and a view step value of 1°, and so on); through reallocation of the target view distribution information of the image sensor, angular resolution of the sub-image, corresponding to the partial region, in which a user or device is interested, in the light field image is higher, and re-focusing granularity of the sub-image corresponding to the partial region is refined, thereby improving sharpness of the all-in-focus image corresponding to the partial region.

The manner of determining the target view distribution information is very flexible, in some cases, quality of a user's or device's light field capture on scene regions at different distances from a lens of the light field camera is different, therefore, in the target view distribution information, the number of average target views corresponding to different regions may present gradual change with a regularity along with an increase of DOF depths of different regions. Optionally, with gradual increase of DOF depths of the different regions, the number of average target views corresponding to the different regions changes from dense to sparse, that is to say, in the target view distribution information, the number of average target views corresponding to a shallower-DOF region is greater than that corresponding to a deeper-DOF region. The solution can perform regional division on the to-be-shot scene in the DOF direction according to actual needs, and flexibly determines target view distribution of imaging regions, corresponding to respective regions, of the image sensor according to a result of the regional division.

Optionally, the determining the target pixel density distribution information according to the target view distribution information comprises: determining distribution information of a sub-lens, which affects light field capture of respective regions in the result of the regional division, in a sub-lens array of the light field camera; determining imaging region distribution information of the image sensor corresponding to the distribution information of the sub-lens; determining imaging sub-region distribution information, corresponding to respective imaging regions and the target view distribution information, in the imaging region distribution information; and determining the target pixel density distribution information according to the imaging sub-region distribution information, wherein in the target pixel density distribution information, target pixel density distribution corresponding to at least two different imaging sub-regions varies. In a situation where light field capture is performed on the to-be-shot scene based on the light field camera, sub-lenses, which affect light field capture of different regions of the to-be-shot scene, in the sub-lens array of the light field camera are not the same, imaging regions of the image sensor of the light field camera corresponding to different sub-lenses are different, and any imaging region comprise multiple imaging sub-regions corresponding to light field capture of different views; therefore, distribution information of the sub-lenses which affect light field capture of different regions of the to-be-shot scene and imaging region distribution information of the image sensor corresponding to the distribution information of the sub-lenses can be determined, imaging sub-region distribution information, corresponding to respective imaging regions and the target view distribution information, in the imaging region distribution information is determined, and the target pixel density distribution information is determined according to the imaging sub-region distribution information, so as to make target pixel density distribution of at least two imaging regions in the image sensor not completely the same, thereby re-adjusting pixel density distribution of the image sensor to acquire light field information of different regions of the to-be-shot scene in the DOF direction differently, to increase light field capture efficiency, which can better meet users' diversified actual application demands. In the solution, for an imaging region of the image sensor with greater target pixel density, details of light field information of a local region, having certain depth distribution, of the to-be-shot scene in the DOF direction acquired are richer, angular resolution of the sub-image, corresponding to the partial region in the light field image is higher, and re-focusing granularity of the sub-image corresponding to the partial region is refined, thereby improving sharpness of the all-in-focus image corresponding to the partial region.

Figure 2:
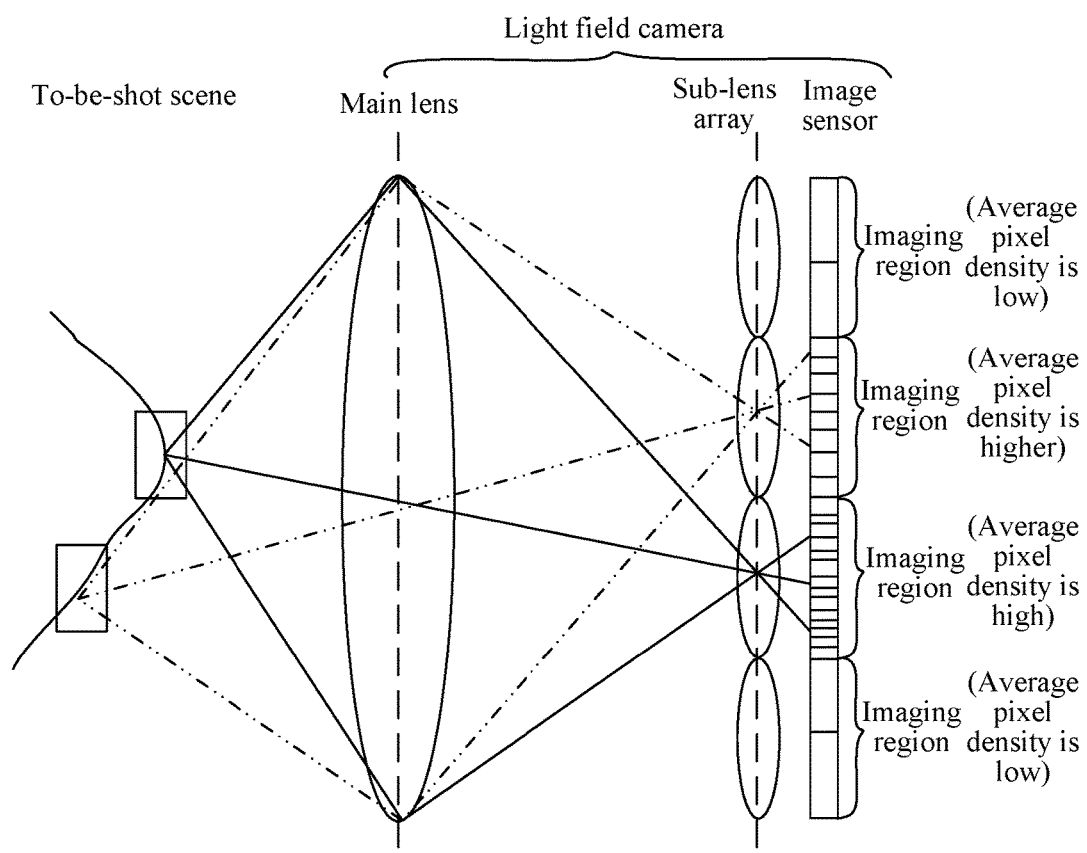
FIG. 2 is a schematic structural diagram of an optical light path of a light field camera according to one embodiment of the subject application.

Further description is given below by taking one optional structure of the light field camera as an example. As shown in FIG. 2, the light field camera comprises: a main lens, a sub-lens array and an image sensor disposed in sequence; the sub-lens array comprises multiple array-distributed sub-lenses, and the sub-lenses have the same focal length; and a distance between the image sensor and the sub-lens array is equal to the focal length of the sub-lenses. Spatial resolution of an image (such as the preview image) of a certain view of the to-be-shot scene acquired based on the light field camera corresponds to sub-lens distribution of the sub-lens array, each sub-lens corresponds to a certain imaging unit of the image sensor, and information of the sub-lens for light rays from different directions of a certain part of the to-be-shot scene is recorded through the imaging unit. That is, in the light field camera, a one-to-one corresponding relationship (hereinafter referred to as "first mapping relationship") exists between pixel distribution of the preview image and sub-lens distribution of the sub-lens array, a one-to-one corresponding relationship (hereinafter referred to as "second mapping relationship") exists between sub-lens distribution of the sub-lens array and imaging region distribution of the image sensor, and a one-to-one corresponding relationship (hereinafter referred to as "third mapping relationship") exists between different views of a certain sub-lens and different imaging sub-regions of the image sensor.

For example, suppose that the sub-lens array comprises M×N sub-lenses, resolution of the image sensor is A×B, A×B pixels of the image sensor are divided into M×N imaging regions (A is greater than M, and B is greater than N), each imaging region corresponds to one sub-lens, configured to record light field information of light rays separated by the sub-lens, comprising light intensity, view direction and other information. A preview image of the light field camera for the to-be-shot scene is generally imaging of a certain view of the scene recorded by the image sensor, and spatial resolution of the preview image corresponds to sub-lens distribution of the sub-lens array, which is M×N.

Therefore, distribution information of sub-lenses, which affect light field capture of respective regions in the result of the regional division, in the sub-lens array of the light field camera can be determined according to the first mapping relationship between pixel distribution of a preview image of the to-be-shot scene acquired by the light field camera and sub-lens distribution of the sub-lens array; imaging distribution information of the image sensor corresponding to the distribution information of sub-lens can be determined according to the second mapping relationship between sub-lens distribution of the sub-lens array and imaging region distribution of the image sensor; and imaging sub-region distribution information, corresponding to respective imaging regions and the target view distribution information, in the imaging region distribution information can be determined according to the third mapping relationship between views of the sub-lenses and imaging sub-regions of the image sensor. Afterwards, target pixel density distribution information of the image sensor is determined according to the imaging region distribution information or the imaging sub-region distribution information, and pixel density distribution of the image sensor is adjusted according to the target pixel density distribution information, to cause overall pixel density distribution of the adjusted image sensor to be uneven, for example, as shown in FIG. 2, average pixel density of a local imaging region (for example, a deepest DOF region, i.e., a region, farthest from the main lens of the light field camera, in the to-be-shot scene) is low, average pixel density of a local imaging region (for example, a deeper DOF region, i.e., a region, farther from the main lens of the light field camera, in the to-be-shot scene) is higher, average pixel density of a local imaging region (for example, a shallowest DOF region, i.e., a region, nearest to the main lens of the light field camera, in the to-be-shot scene) is high, and so on, thus achieving uneven capture of light fields of different regions of the scene in the DOF direction; the solution is simple and easy to implement, and improves use convenience of the users.

According to the embodiment of the subject application, after the image target pixel density distribution information is acquired, pixel density distribution of the image sensor can be adjusted according to the target pixel density distribution information, and the manner of adjusting the pixel density distribution of the image sensor can be selected according to actual needs, which is not limited in the embodiment of the subject application. In one optional implementation, deformation control information of a controllable deformed material portion is determined according to the target pixel density distribution information; and the controllable deformed material portion is controlled to produce deformation according to the deformation control information, so as to correspondingly adjust the pixel density distribution of the image sensor through the deformation of the controllable deformed material portion. The solution adjusts pixel distribution of the image sensor by controlling deformation of a controllable deformed material portion, and the solution is simple and easy to implement.

The controllable deformed material portion can produce deformation by changing a certain external effect factor (such as an external field) acting on the controllable deformed material portion, and when the external field acting thereon is cancelled or changed, the deformation of the controllable deformed material portion can be restored.

Figure 1B:
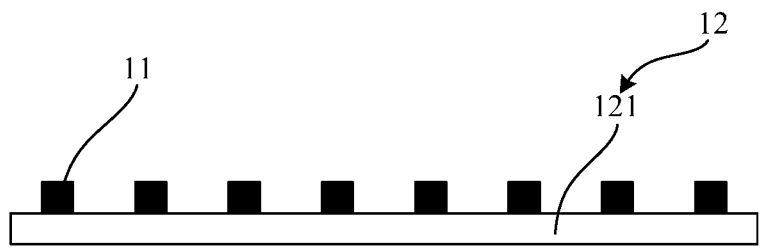
FIG. 1b is a schematic structural diagram of a first image sensor with adjustable pixel density according to one embodiment of the subject application.

FIG. 1b is a schematic structural diagram of an image sensor with adjustable pixel density according to one embodiment of the subject application. As shown in FIG. 1b, the image sensor with adjustable pixel density provided in the embodiment of the subject application comprises: multiple image sensor pixels 11 and a controllable deformed material portion 12, wherein the image sensor performs image capture through the image sensor pixels 11, the multiple image sensor pixels 11 are array-distributed, and the controllable deformed material portion 12 is connected with the multiple image sensor pixels 11 respectively; the controllable deformed material portion 12 may produce deformation under the action of an external field, and density distribution of the multiple image sensor pixels 11 is correspondingly adjusted through the deformation of the controllable deformed material portion 12.

In the technical solution provided in the embodiment of the subject application, the controllable deformed material portion can produce deformation by changing a certain external field effect factor on the controllable deformed material portion, when the certain external field effect factor is cancelled or changed, the deformation of the controllable deformed material portion can be restored, and a corresponding control external field acting thereon may be selected as the external field with respect to deformation characteristics of the controllable deformed material portion, for example, the external field comprises, but is not limited to, an external electric field, a magnetic field, a light field and the like. The image sensor pixels may comprise, but are not limited to, at least one photoelectric conversion unit. Each of the image sensor pixels and the controllable deformed material portion may be closely connected in a manner which comprises, but is not limited to, adhesion, in this way, when the controllable deformed material portion produces deformation, spacing between the image sensor pixels will be adjusted correspondingly, thus changing density distribution of the image sensor pixels and achieving the effect of giving differentiated pixel density distribution to different regions of the image sensor according to actual requirements.

During actual applications, an unevenly distributed external field can act on different regions of the controllable deformed material portion, to cause different regions of the controllable deformed material portion to produce deformation differently, thus adjusting the overall density distribution of the image sensor pixels. Optionally, the external field can act on a region where the controllable deformed material portion and the image sensor pixels do not overlap, to cause a region where the controllable deformed material portion and the image sensor pixels overlap not to produce deformation, and the pixel density distribution of the image sensor is changed through deformation of other parts of the controllable deformed material portion; the solution helps to avoid damage to the image sensor pixels caused by deformation of the controllable deformed material portion.

During actual applications, at least one suitable controllable deformed material can be selected as required to prepare the controllable deformed material portion, to cause the controllable deformed material portion to have characteristics of being deformable and having recoverable deformation. Optionally, the controllable deformed material portion is prepared from at least one of the following controllable deformed materials: piezoelectric materials, electroactive polymers, photodeformation materials and magnetostriction materials.

The piezoelectric materials may produce mechanical deformation due to the action of an electric field. The controllable deformed material portion prepared from the piezoelectric materials is hereinafter referred to as a piezoelectric material portion. By use of such a physical property of the piezoelectric material, the embodiment of the subject application can determine electric field control information configured to make the piezoelectric material portion produce corresponding mechanical deformation according to, but not limited to, the target pixel density distribution information, control an electric field acting on the piezoelectric material portion according to the electric field control information, to cause the piezoelectric material portion to produce corresponding mechanical deformation, and correspondingly adjust pixel density distribution of the image sensor through the mechanical deformation of the piezoelectric material portion, thus achieving the purpose of adjusting pixel density distribution of the image sensor according to the target pixel density distribution information. The piezoelectric materials may comprise, but are not limited to, at least one of the following: piezoelectric ceramic and piezoelectric crystal. The solution can make full use of the physical property of the piezoelectric material to adjust pixel density distribution of the image sensor.

The Electroactive Polymers (referred to as EAPs) are one kind of polymer materials that can change their shapes or sizes under the action of an electric field. The controllable deformed material portion prepared from the EAPs is hereinafter referred to as an EAP portion. By use of such a physical property of the EAPs, the embodiment of the subject application can determine electric field control information configured to make the EAP portion produce corresponding deformation according to, but not limited to, the target pixel density distribution information, control an electric field acting on an EAP layer according to the electric field control information, to cause the EAP layer to produce corresponding deformation, and correspondingly adjust pixel density distribution of the image sensor through the deformation of the EAP layer, thus achieving the purpose of adjusting pixel density distribution of the image sensor according to the target pixel density distribution information. The EAP materials may comprise, but are not limited to, at least one of the following: electronic EAPs and ionic EAPs; the electronic EAPs comprise at least one of the following: ferroelectric polymers (such as polyvinylidene fluoride), electrostrictive grafted elastomers and liquid crystal elastomers; and the ionic EAPs comprise at least one of the following: electrorheological fluids, ionic polymer-metallic composite materials and the like. The solution can make full use of the physical property of the EAPs to adjust pixel density distribution of the image sensor.

The photodeformation materials are one kind of polymer materials that can change their shapes or sizes under the action of a light field. The controllable deformed material portion prepared from the photodeformation materials is hereinafter referred to as a photodeformation material portion. By use of such a physical property of the photodeformation materials, the embodiment of the subject application can determine light field control information configured to make the photodeformation material portion produce corresponding deformation according to, but not limited to, the target pixel density distribution information, control a light field acting on the photodeformation material portion according to the light field control information, to cause the photodeformation material portion to produce corresponding deformation, and correspondingly adjust pixel density distribution of the image sensor through the deformation of the photodeformation material portion, thus achieving the purpose of adjusting pixel density distribution of the image sensor according to the target pixel density distribution information. The photodeformation materials may comprise, but are not limited to, at least one of the following: photostrictive ferroelectric ceramics and photodeformation polymers; the photostrictive ferroelectric ceramics comprise, but are not limited to, lead lanthanum zirconate titanate (PLZT) ceramics, and the photodeformation polymers comprise, but are not limited to, photodeformation liquid crystal elastomers. The solution can make full use of the physical property of the photodeformation material to adjust pixel density distribution of the image sensor.

The magnetostriction materials are one kind of magnetic materials that can change a magnetization state thereof under the action of a magnetic field and then change their sizes. The controllable deformed material portion prepared from the magnetostriction materials is hereinafter referred to as a magnetostriction material portion. By use of such a physical property of the magnetostriction materials, the embodiment of the subject application can determine magnetic field control information configured to make the magnetostriction material produce corresponding deformation according to, but not limited to, the target pixel density distribution information, control a magnetic field acting on the magnetostriction material portion according to the magnetic field control information, to cause the magnetostriction material portion to produce corresponding deformation, and correspondingly adjust pixel density distribution of the image sensor through the deformation of the magnetostriction material portion, thus achieving the purpose of adjusting pixel density distribution of the image sensor according to the target pixel density distribution information. The magnetostriction materials may comprise, but are not limited to, rare-earth giant magnetostrictive materials, such as alloy $Tbo_{0.3}Dy_{0.7}Fe_{1.95}$ materials using a $(Tb,Dy)Fe_2$ compound as a substrate. The solution can make full use of the physical property of the magnetostriction material to adjust pixel density distribution of the image sensor.

In the technical solution provided in the embodiment of the subject application, specific structures and connecting modes of the image sensor pixels and the controllable deformed material portion can be determined according to actual requirements, and the actual modes are very flexible.

In one optional implementation, as shown in FIG. 1b, the controllable deformed material portion 12 comprises: a controllable deformed material layer 121, the multiple image sensor pixels 11 being array-distributed and connected to one side of the controllable deformed material layer 121. Optionally, it is feasible to choose to directly from the multiple image sensor pixels on the controllable deformed material portion 12 according to actual process conditions, or the multiple image sensor pixels and the controllable deformed material portion 12 can be prepared respectively and can be closely connected in a manner which comprises, but is not limited to, adhesion. The solution has a simple structure and is easy to implement.

Figure 1C:
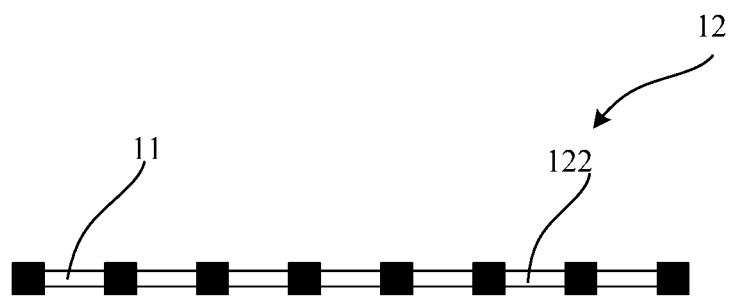
FIG. 1c is a schematic structural diagram of a second image sensor with adjustable pixel density according to one embodiment of the subject application.

In another optional implementation, as shown in FIG. 1c, the controllable deformed material portion 12 comprises multiple controllable deformed material connecting sub-portions 122, the multiple controllable deformed material connecting sub-portions 122 being array-distributed, so as to correspondingly connect the multiple image sensor pixels 11 array-distributed, that is, the multiple image sensor pixels array-distributed are connected into one piece through the multiple controllable deformed material connecting sub-portions array-distributed. Optionally, the multiple controllable deformed material connecting sub-portions can be formed in spacing regions of pixels of an image sensor pixel array according to an actual process, and the multiple controllable deformed material connecting sub-portions and the corresponding image sensor pixels may be connected in a manner which comprises, but is not limited to, abutment and adhesion. The density distribution of the image sensor pixels can be adjusted by controlling deformation of the multiple controllable deformed material connecting sub-portions; the structure is simple and is easy to implement.

Figure 1D:
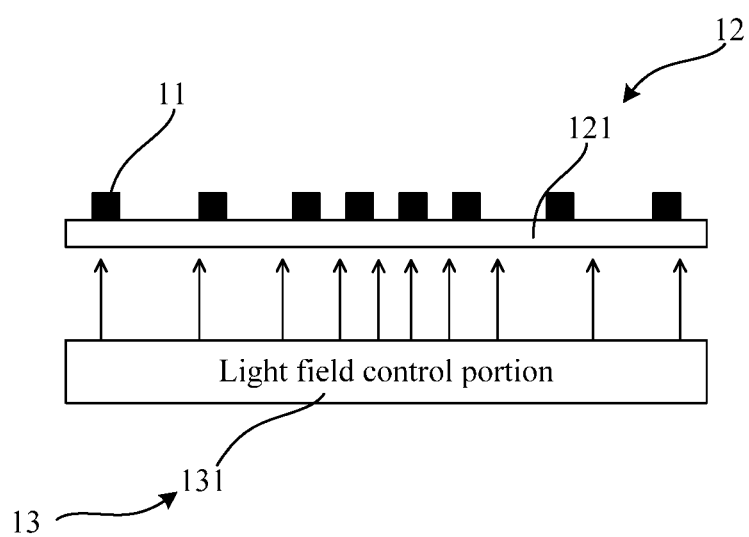
FIG. 1d is a schematic structural diagram of a third image sensor with adjustable pixel density according to one embodiment of the subject application.
Figure 1E:
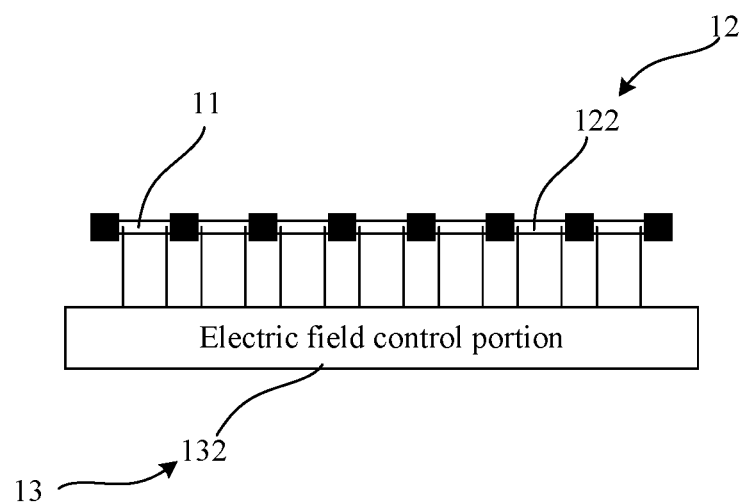
FIG. 1e is a schematic structural diagram of a fourth image sensor with adjustable pixel density according to one embodiment of the subject application.

Further, as shown in FIG. 1d and FIG. 1e, the image sensor may further comprise: a deformation control portion 13, wherein the deformation control portion 13 is configured to adjust distribution of the external field acting on the controllable deformed material portion 12, so as to control the controllable deformed material portion 12 to produce corresponding deformation, in this way, when the controllable deformed material portion 12 produces deformation, the spacing between the image sensor pixels 11 may be adjusted correspondingly, thus changing density distribution of the image sensor pixels 11 and achieving the effect of giving differentiated pixel density distribution to different regions of the image sensor according to actual requirements.

Optionally, as shown in FIG. 1d, the deformation control portion comprises a light field control portion 131, wherein the light field control portion 131 is configured to adjust distribution of an external light field acting on the controllable deformed material portion 12, so as to control the controllable deformed material portion 12 to produce corresponding deformation. In this case, the controllable deformed material portion 12 may comprise a photodeformation material portion prepared from at least photodeformation materials, for example, the photodeformation material portion may comprise a photodeformation material layer prepared from at least the photodeformation materials, or the controllable deformed material portion may comprise multiple photodeformation material connecting sub-portions prepared from at least the photodeformation materials. The light field control portion 131 excites different regions of the controllable deformed material portion 12 to produce deformation differently by changing light field distribution acting on the photodeformation material portion (in FIG. 1d, the light field with different intensity distribution acting on the controllable deformed material portion 12 is represented through arrow density), and the spacing between the image sensor pixels 11 is adjusted correspondingly through the deformation of the controllable deformed material portion 12, thus changing density distribution of the image sensor pixels 11 and achieving the effect of giving differentiated pixel density distribution to different regions of the image sensor according to actual requirements.

Figure 1F:
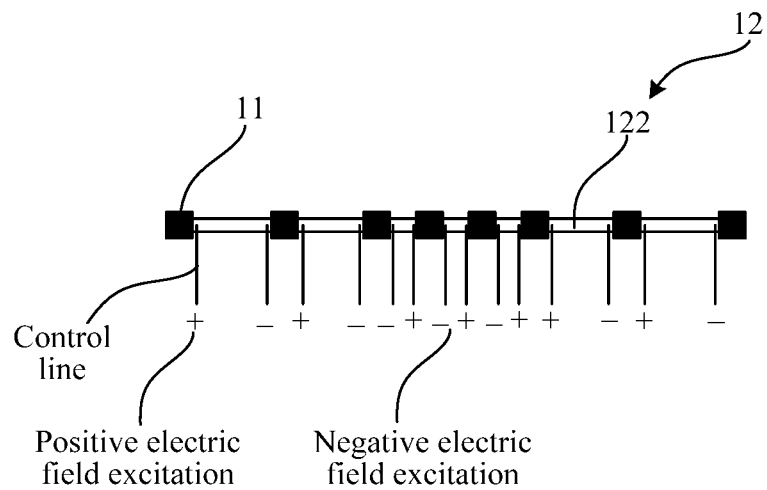
FIG. 1f is an example of a scene where an image sensor adjusts pixel density in the event of uneven light field excitation according to one embodiment of the subject application.

Optionally, as shown in FIG. 1e, the deformation control portion comprises an electric field control portion 132, wherein the electric field control portion 132 is configured to adjust distribution of an external electric field acting on the controllable deformed material portion, so as to control the controllable deformed material portion to produce corresponding deformation. In this case, the controllable deformed material portion 12 may comprise a piezoelectric material portion prepared from at least piezoelectric materials (such as a piezoelectric material layer or a piezoelectric material connecting sub-portion), or the controllable deformed material portion 12 may comprise an EAP portion prepared from at least EAPs (such as an EAP layer or an EAP connecting sub-portion). As shown in FIG. 1e, the electric field control portion and the controllable deformed material can be connected through a control line, and the electric field control portion 132 excites different regions of the controllable deformed material portion 12 to produce deformation differently by changing electric field distribution acting on the controllable deformed material portion. If the electric field acting on the controllable deformed material portion 12 is a zero field, the controllable deformed material portion does not produce deformation (might as well be called zero field excitation); if intensity distribution of the electric field acting on the controllable deformed material portion 12 (for example, "+" positive electric field excitation and "−" negative electric field excitation shown in FIG. 1e) is changed to cause the intensity of the electric field acting on different regions of the controllable deformed material portion 12 to vary, as shown in FIG. 1f, in this way, the different regions of the controllable deformed material portion may produce deformation differently, and the spacing between the image sensor pixels 11 is adjusted correspondingly through the deformation of the controllable deformed material portion 12, thus changing the overall pixel density distribution of the image sensor and achieving the effect of giving differentiated pixel density distribution to different regions of the image sensor according to actual requirements.

In the embodiment of the subject application, the controllable deformed portion and the deformation control portion may be directly or indirectly connected. The deformation control portion may serve as a part of the image sensor, or the deformation control portion may not serve as a part of the image sensor, and the image sensor may also be connected with the deformation control portion through a reserved pin or interface or the like. The external field acting on the controllable deformed material portion may comprise, but is not limited to, an electric field, a magnetic field, a light field and the like. A hardware or software structure configured to produce the electric field, a hardware or software structure configured to produce the magnetic field, a hardware or software structure configured to produce the light field and the like can be achieved by using corresponding existing technologies according to actual requirements, which is no longer repeated herein in the embodiment of the subject application.

Figure 1G:
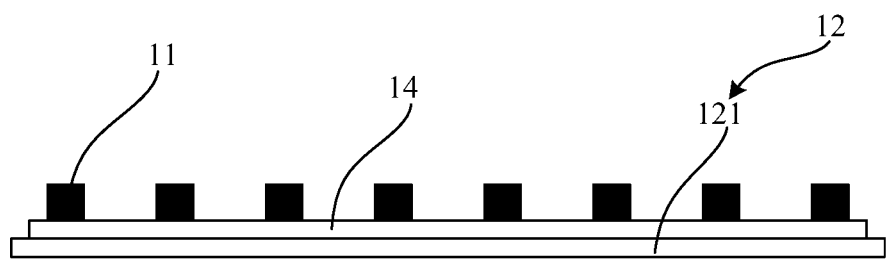
FIG. 1g is a schematic structural diagram of a fifth image sensor with adjustable pixel density according to one embodiment of the subject application.
Figure 1H:
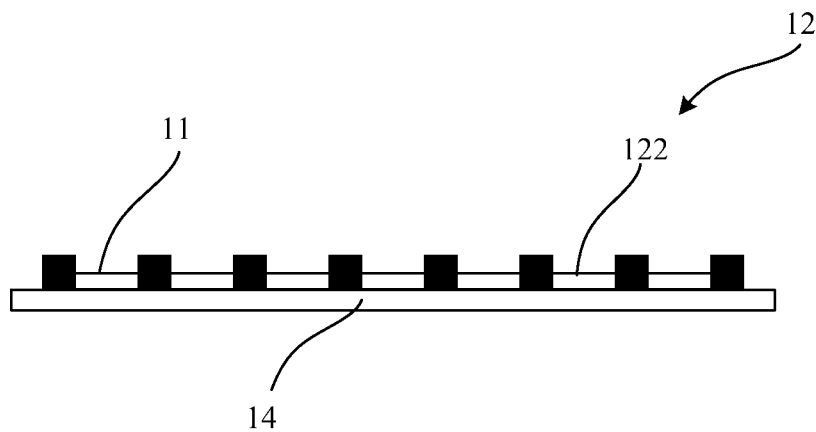
FIG. 1h is a schematic structural diagram of a sixth image sensor with adjustable pixel density according to one embodiment of the subject application.

Optionally, the image sensor may further comprise a flexible substrate, and the flexible substrate may comprise, but is not limited to, a flexible plastic substrate, which has certain flexibility and can change the shape of the flexible substrate according to requirements. The image sensor pixels and the controllable deformed material portion may be disposed on the same side or different sides of the flexible substrate. For example, as shown in FIG. 1g, the multiple image sensor pixels 11 are connected to one side of the flexible substrate 14, and the controllable deformed material portion (for example, the controllable deformed material layer 121) is connected to the other side of the flexible substrate 14. For another example, as shown in FIG. 1h, the multiple image sensor pixels 11 are connected to one side of the flexible substrate 14, and the controllable deformed material portion (for example, the controllable deformed material connecting sub-portion 122) is connected to the corresponding image sensor pixel and is located on the same side of the flexible substrate 14 with the image sensor pixel 11. The solution not only can indirectly adjust the overall pixel density distribution of the image sensor by controlling its deformation through the external field acting on the controllable deformed material portion, to achieve adjustable pixel density of the image sensor, but also can flexibly change the shape of the image sensor due to use of the flexible substrate, for example, a plane image sensor is bent to a certain angle to obtain a surface image sensor, thus meeting application demands such as diversified image capture and decoration.

Figure 1I:
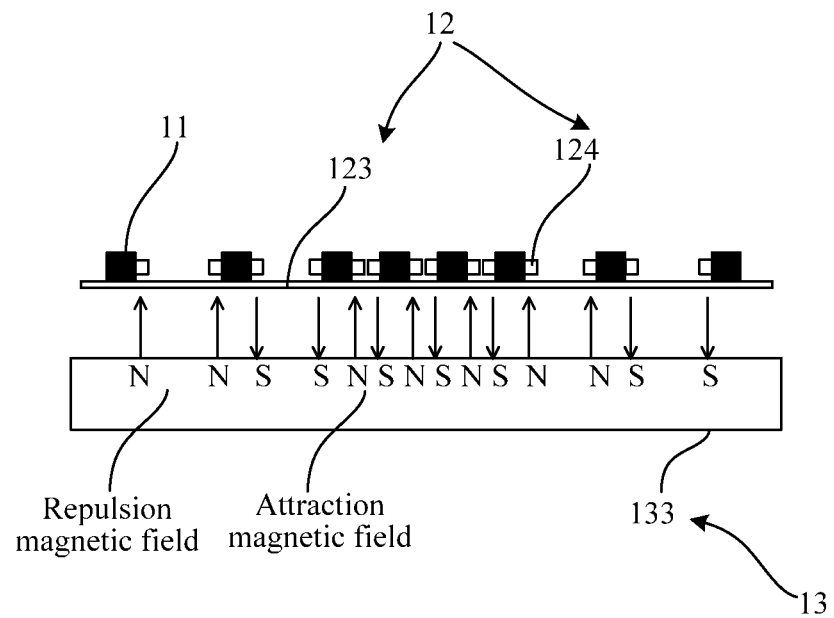
FIG. 1i is a schematic structural diagram of a seventh image sensor with adjustable pixel density according to one embodiment of the subject application.

FIG. 1i is a schematic structural diagram of a seventh image sensor with adjustable pixel density according to one embodiment of the subject application. In the image sensor as shown in FIG. 1i, the controllable deformed material portion 12 comprises: a flexible substrate 123 and multiple permeability magnetic material portions 124; the multiple image sensor pixels 11 are respectively connected with the flexible substrate 123, at least a part of the image sensor pixels 11 are connected with the multiple permeability magnetic material portions 124, the flexible substrate 123 produces corresponding deformation by changing a magnetic field acting on the permeability magnetic material portions 124, and density distribution of the multiple image sensor pixels 11 is correspondingly adjusted through the deformation. For example, a permeability magnetic material portion 124 can be disposed on a side face of each image sensor pixel, and optionally, the image sensor pixel 11 is respectively adhered to the flexible substrate 123 and the permeability magnetic material portion 124. The permeability magnetic material portion may comprise a magnetic pole prepared from a permeability magnetic material, and the permeability magnetic material may comprise, but is not limited to, one or more of a soft magnetic material, a silicon steel sheet, a permalloy, ferrite, an amorphous soft magnetic alloy, and a super-microcrystalline soft magnetic alloy. The permeability magnetic material portion prepared from the soft magnetic material has better permeability, and small residual magnetization after cancellation of the magnetic field facilitates next adjustment.

Further, optionally, the deformation control portion 13 in the embodiment of the subject application may further comprise: a magnetic field control portion 133, wherein the magnetic field control portion 133 is configured to adjust distribution of an external magnetic field acting on the controllable deformed material portion, so as to control the controllable deformed material portion to produce corresponding deformation. For example, when the magnetic field control portion 133 controls the magnetic field (that is, excitation magnetic field) acting on the permeability magnetic material portion 124, as shown in FIG. 1i, a like magnetic pole (NN or SS) repulsion magnetic field or an unlike magnetic pole (NS or SN) attraction magnetic field with certain magnetic field intensity distribution is applied between adjacent image sensor pixels, the poles may produce a corresponding repelling force or attracting force therebetween, the magnetic force is transferred to the flexible substrate 123 to make the flexible substrate 123 produce deformation such as expansion and contraction, thereby resulting in that the spacing between the corresponding image sensor pixels changes and achieving the purpose of adjusting pixel density distribution of the image sensor. The solution achieves adjustable pixel density distribution of the image sensor in combination with scalable deformation characteristics of the flexible substrate and the magnetic field control principle.

Figure 1J:
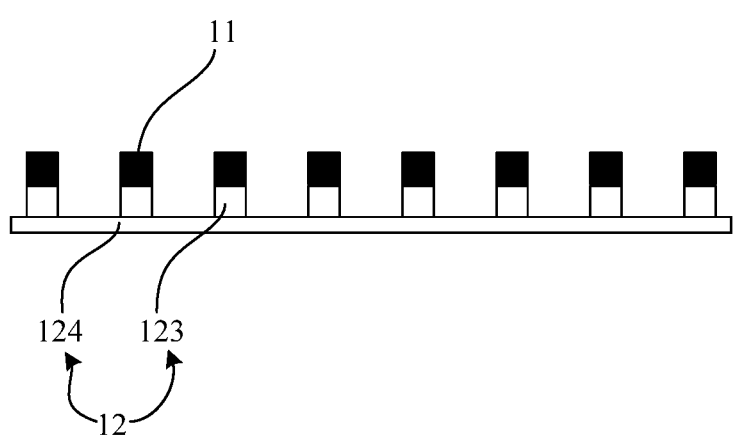
FIG. 1j is a schematic structural diagram of an eighth image sensor with adjustable pixel density according to one embodiment of the subject application.

FIG. 1j is a schematic structural diagram of an eighth image sensor with adjustable pixel density according to one embodiment of the subject application. In the image sensor as shown in FIG. 1j, the controllable deformed material portion 12 comprises: a flexible substrate 123 and multiple permeability magnetic material portions 124; one side of the multiple permeability magnetic material portions 124 is respectively connected with the flexible substrate 123, an opposite face of the multiple permeability magnetic material portions 124 is respectively connected with the multiple image sensor pixels 11 correspondingly, the flexible substrate 123 produces corresponding deformation by changing a magnetic field acting on the permeability magnetic material portions 124, and density distribution of the multiple image sensor pixels 11 is correspondingly adjusted through the deformation. Optionally, the permeability magnetic material portions 124 are adhered to the flexible substrate 123, the image sensor pixels 11 are adhered to the permeability magnetic material portions 124, and when the magnetic field acting on the permeability magnetic material portions 124 changes, the magnetic force is transferred to the flexible substrate 123 to make the flexible substrate 123 produce deformation such as expansion and contraction, thereby achieving the purpose of adjusting pixel density distribution of the image sensor. The solution achieves adjustable pixel density distribution of the image sensor in combination with scalable deformation characteristics of the flexible substrate and the magnetic field control principle.

After pixel density distribution of the image sensor is adjusted according to the target pixel density distribution information, image capture of the to-be-shot scene is performed, and during image capture, various image sensor pixels of the image sensor all participate in the image capture. As pixel density distribution of the image sensor has been adjusted according to the target pixel density distribution information and the image target pixel density distribution information is determined according to depth information of the to-be-shot scene, light field images of which richness of light field information of different regions of the scene in the DOF direction can be obtained according to information of the to-be-shot scene acquired by the adjusted image sensor, in a part of the image sensor requiring richer light field information (comprising image spatial resolution and/or angular resolution) relative to the target pixel density distribution information, there will be more pixels participating in the light field capture, and light field information acquired by the part is richer; while in other parts of the image sensor, there will be fewer pixels participating in the light field capture, and the light field information is less rich; thus, light field capture efficiency is improved on the whole, and actual application demands of improving, such as definition of a certain DOF re-focused image and/or sharpness of an all-in-focus image within a certain DOF range are met.

It should be understood by those skilled in the art that, in any one of the foregoing methods of the specific implementations of the subject application, the value of the serial number of each step described above does not mean an execution sequence, and the execution sequence of each step should be determined according to the function and internal logic thereof, and should not be any limitation to the implementation procedure of the specific implementations of the subject application.

Figure 3:
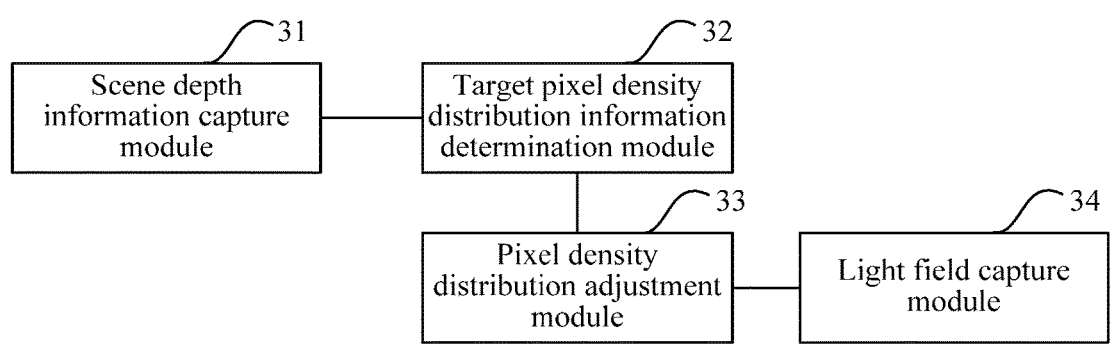
FIG. 3 is a logic block diagram of one light field capture control apparatus according to one embodiment of the subject application.

FIG. 3 is a logic block diagram of one light field capture control apparatus according to one embodiment of the subject application. As shown in FIG. 3, a light field capture control apparatus according to the embodiment of the subject application comprises: a scene depth information capture module 31, a target pixel density distribution information determination module 32, a pixel density distribution adjustment module 33 and a light field capture module 34.

The scene depth information capture module 31 is configured to acquire depth information of a to-be-shot scene.

The target pixel density distribution information determination module 32 is configured to determine target pixel density distribution information of an image sensor of a light field camera according to the depth information.

The pixel density distribution adjustment module 33 is configured to adjust pixel density distribution of the image sensor according to the target pixel density distribution information.

The light field capture module 34 is configured to perform light field capture of the to-be-shot scene via the adjusted image sensor.

The technical solution provided in the embodiment of the subject application determines target pixel density distribution information of an image sensor of a light field camera according to the depth information, adjusts pixel density distribution of the image sensor according to the target pixel density distribution information, and performs light field capture of the to-be-shot scene via the adjusted image sensor, which can make full use of overall pixels of the image sensor of the light field camera to unevenly record light field information of different regions of the to-be-shot scene in a DOF direction, to cause richness of the light field information of different regions of the scene in the DOF direction recorded by the light field images acquired to be different, thereby improving light field capture efficiency and meeting actual application demands of, for example, improving sharpness of all-in-focus images of a local region of the to-be-shot scene.

Device manifestations of the light field capture control apparatus are not limited, for example, the light field capture control apparatus may be a certain separate component, and the component cooperates with the light field camera for communications; or the light field capture control apparatus may be integrated, as a certain functional module, into an image capture device comprising a light field camera, which is not limited in the embodiment of the subject application.

Figure 4:
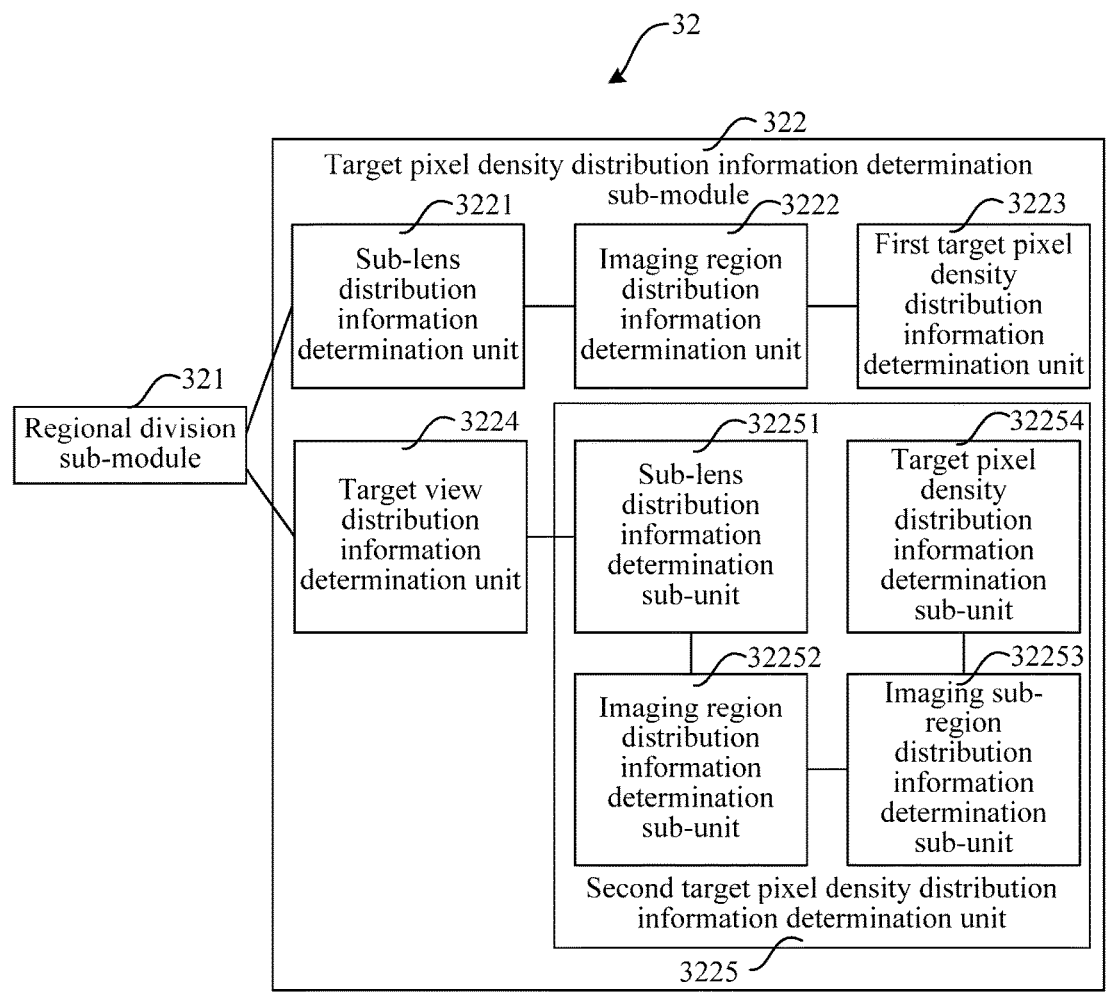
FIG. 4 is a logic block diagram of a target pixel density distribution information determination module according to one embodiment of the subject application.

Optionally, as shown in FIG. 4, the target pixel density distribution information determination module comprises: a regional division sub-module 321 and a target pixel density distribution information determination sub-module 322. The regional division sub-module 321 is configured to perform regional division on the to-be-shot scene in a DOF direction according to the depth information; and the target pixel density distribution information determination sub-module 322 is configured to determine the target pixel density distribution information according to a result of the regional division, wherein in the target pixel density distribution information, target pixel density distribution corresponding to at least two different regions divided varies. The "target pixel density distribution varies" indicates that target pixel density distribution of imaging regions configured to record light field information of different regions of the scene is not completely the same. The solution can perform regional division on the to-be-shot scene in the DOF direction according to actual needs, and flexibly determines target pixel density distribution of imaging regions, corresponding to respective regions, of the image sensor according to a result of the regional division, which achieves differential capture of light field information of different regions of the to-be-shot scene in the DOF direction on the basis of making full use of overall pixels of the image sensor, and the implementation is very flexible.

In one optional implementation, the target pixel density distribution information determination sub-module 322 comprises: a sub-lens distribution information determination unit 3221, an imaging region distribution information determination unit 3222 and a first target pixel density distribution information determination unit 3223. The sub-lens distribution information determination unit 3221 is configured to determine distribution information of a sub-lens, which affects light field capture of respective regions in the result of the regional division, in a sub-lens array of the light field camera; the imaging region distribution information determination unit 3222 is configured to determine imaging region distribution information of the image sensor corresponding to the distribution information of the sub-lens; and the first target pixel density distribution information determination unit 3223 is configured to determine the target pixel density distribution information according to the imaging region distribution information, wherein in the target pixel density distribution information, target pixel density distribution corresponding to at least two different imaging regions varies. The solution acquires light field information of different regions of the to-be-shot scene in the DOF direction differently by re-adjusting the pixel density distribution of the image sensor of the light field camera, to improve light field capture efficiency, which can better meet users' diversified actual application demands.

In another optional implementation, the target pixel density distribution information determination sub-module 322 comprises: a target view distribution information determination unit 3224 and a second target pixel density distribution information determination unit 3225. The target view distribution information determination unit 3224 is configured to determine target view distribution information of light field capture of the to-be-shot scene according to the result of the regional division; and the second target pixel density distribution information determination unit 3225 is configured to determine the target pixel density distribution information according to the target view distribution information.

Further optionally, the second target pixel density distribution information determination unit 3225 may comprise: a sub-lens distribution information determination sub-unit 32251, an imaging region distribution information determination sub-unit 32252, an imaging sub-region distribution information determination sub-unit 32253 and a target pixel density distribution information determination sub-unit 32254. The sub-lens distribution information determination sub-unit 32251 is configured to determine distribution information of a sub-lens, which affects light field capture of respective regions in the result of the regional division, in a sub-lens array of the light field camera; the imaging region distribution information determination sub-unit 32252 is configured to determine imaging region distribution information of the image sensor corresponding to the distribution information of the sub-lens; the imaging sub-region distribution information determination sub-unit 32253 is configured to determine imaging sub-region distribution information, corresponding to respective imaging regions and the target view distribution information, in the imaging region distribution information; and the target pixel density distribution information determination sub-unit 32254 is configured to determine the target pixel density distribution information according to the imaging sub-region distribution information, wherein in the target pixel density distribution information, target pixel density distribution corresponding to at least two different imaging sub-regions varies. The solution acquires light field information of different view distribution of different regions of the to-be-shot scene in the DOF direction differently by re-adjusting pixel density distribution of imaging sub-regions, corresponding to different views, of the image sensor, to improve light field capture efficiency, which can better meet users' diversified actual application demands.

Figure 5:
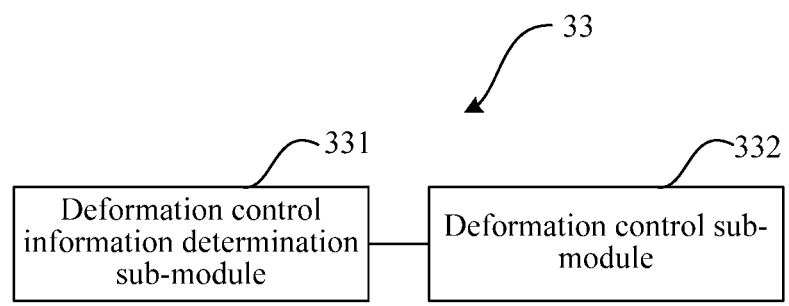
FIG. 5 is a logic block diagram of a pixel density distribution adjustment module according to one embodiment of the subject application.

Optionally, as shown in FIG. 5, the pixel density distribution adjustment module 33 comprises: a deformation control information determination sub-module 331 and a deformation control sub-module 332. The deformation control information determination sub-module 331 is configured to determine deformation control information of a controllable deformed material portion according to the target pixel density distribution information; and the deformation control sub-module 332 is configured to control the controllable deformed material portion to produce deformation according to the deformation control information, so as to correspondingly adjust the pixel density distribution of the image sensor through the deformation of the controllable deformed material portion. The controllable deformed material portion can produce deformation by changing a certain external effect factor (such as an external field) acting on the controllable deformed material portion, and when the external field acting thereon is cancelled or changed, the deformation of the controllable deformed material portion can be restored. Optionally, the controllable deformed material portion is prepared from at least one of the following controllable deformed materials: piezoelectric materials, electroactive polymers, photodeformation materials and magnetostriction materials. The solution adjusts pixel distribution of the image sensor by controlling deformation of a controllable deformed material portion, and the solution is simple and easy to implement.

Figure 6:
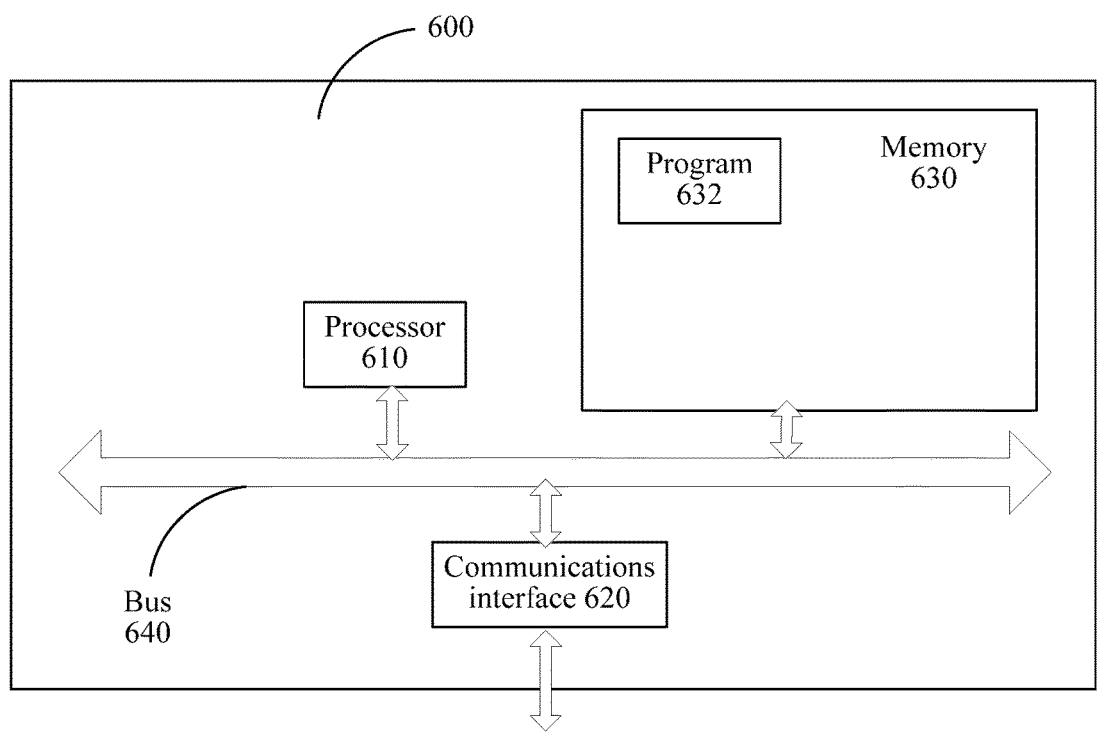
FIG. 6 is a logic block diagram of another light field capture control apparatus according to one embodiment of the subject application.

FIG. 6 is a logic block diagram of another light field capture control apparatus according to one embodiment of the subject application; the specific embodiment of the subject application does not limit specific implementations of the light field capture control apparatus 600. As shown in FIG. 6, the light field capture control apparatus 600 may comprise:

a processor 610, a Communications Interface 620, a memory 630, and a communications bus 640.

The processor 610, the Communications Interface 620, and the memory 630 accomplish mutual communications via the communications bus 640.

The Communications Interface 620 is configured to communicate with, for example, devices or external light sources with a communications function.

The processor 610 is configured to execute a program 632, and specifically, can implement relevant steps in any embodiment of the light field capture control method.

Specifically, the program 632 may comprise a program code, the program code comprising a computer operation instruction.

The processor 610 may be a central processing unit (CPU), or an application specific integrated circuit (ASIC), or be configured to be one or more integrated circuits which implement the embodiments of the subject application.

The memory 630 is configured to store the program 632. The memory 630 may comprise a high-speed RAM memory, and may also comprise a non-volatile memory, for example, at least one magnetic disk memory.

For example, in one optional implementation, the processor 610 may perform the following steps by executing the program 632: acquiring depth information of a to-be-shot scene; determining target pixel density distribution information of an image sensor of a light field camera according to the depth information; adjusting pixel density distribution of the image sensor according to the target pixel density distribution information; and performing, by the adjusted image sensor, light field capture of the to-be-shot scene.

In other optional implementations, the processor 610 may further perform the steps mentioned in the any other embodiments by executing the program 632, which is not repeated herein.

Reference can be made to corresponding description in the corresponding steps, modules, sub-modules and units in the embodiments for specific implementation of the steps in the program 632, which is not repeated herein. Those skilled in the art can clearly understand that, reference can be made to the corresponding process description in the method embodiments for the devices described above and the specific working procedures of the modules, and will not be repeated herein in order to make the description convenient and concise.

Figure 7:
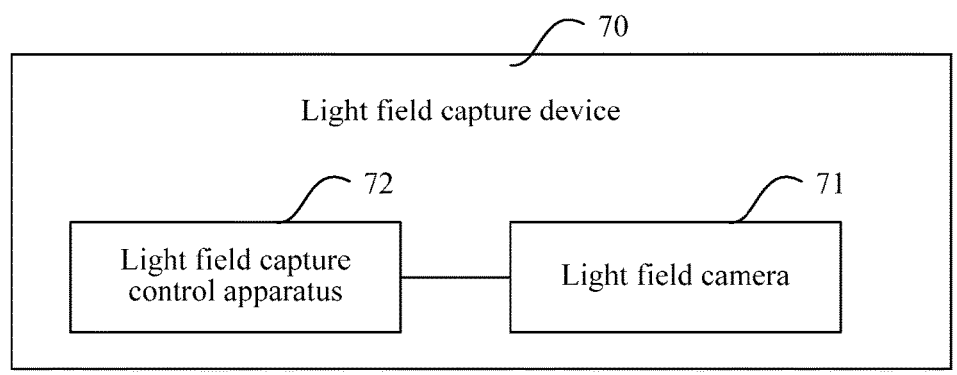
FIG. 7 is a logic block diagram of a light field capture device according to one embodiment of the subject application.

FIG. 7 is a logic block diagram of a light field capture device according to one embodiment of the subject application. As shown in FIG. 7, a light field capture device 70 according to the embodiment of the subject application comprises a light field camera 71 and a light field capture control apparatus 72, and the light field capture control apparatus 72 is connected with the light field capture device 70. Reference can be made to the description in the corresponding embodiment above for the structure and the working principle of the light field capture control apparatus 72, which is not repeated herein. The light field camera may comprise, but is not limited to: devices with phototaking, camera shooting, photographing, video monitoring and other light field capture functions, for example, it may be, but is not limited to, the following device types: a camera, a mobile phone, a webcam, a video camera, a video tape recorder and the like.

The technical solution provided in the embodiment of the subject application determines target pixel density distribution information of an image sensor of a light field camera according to the depth information, adjusts pixel density distribution of the image sensor according to the target pixel density distribution information, and performs light field capture of the to-be-shot scene via the adjusted image sensor, which can make full use of overall pixels of the image sensor of the light field camera to unevenly record light field information of different regions of the to-be-shot scene in a DOF direction, to cause richness of the light field information of different regions of the scene in the DOF direction recorded by the light field images acquired to be different, thereby improving light field capture efficiency and meeting actual application demands of, for example, improving sharpness of all-in-focus images of a local region of the to-be-shot scene.

Optionally, the image sensor may be the flexible image sensor described above. Alternatively, the image sensor may further comprise: multiple image sensor pixels array-distributed; and a controllable deformed material portion respectively connected with the multiple image sensor pixels; wherein the controllable deformed material portion can produce deformation under the action of an external field, and density distribution of the multiple image sensor pixels is correspondingly adjusted through the deformation; the external field is controlled by the imaging control apparatus.

Reference can be made to the corresponding description in FIG. 1b to FIG. 1j for the structure of the image sensor, the imaging control apparatus can directly control the external field to control deformation of the controllable deformed material portion, thereby adjusting pixel density distribution of the image sensor; or the imaging control apparatus can indirectly control the external field by controlling the deformation control portion, to cause the controllable deformed material portion to produce corresponding deformation to correspondingly adjust pixel density distribution of the image sensor; and so on. A manner in which the image sensor pixels and the deformed material portion are physically connected can be determined according to actual needs, as long as the manner can meet that pixel density distribution of the image sensor can be adjusted when the deformed material portion produces deformation, which is not limited in the embodiment of the subject application, and reference can be made to the corresponding description above for a specific implementation thereof; reference can be made to FIG. 2 and the corresponding description above for the light path structure of the light field camera, which is not repeated herein.

In the various embodiments of the subject application, the serial numbers and/or sequence numbers of the foregoing embodiments are merely for the convenience of description, and do not imply the preference among the embodiments. Particular emphasis is put on the description about each embodiment, and reference can be made to relevant description of other embodiments for the content not detailed in a certain embodiment. Reference can be made to the description about the corresponding method embodiments for related description about the implementation principle or process of relevant apparatus, device or system embodiments, which is not repeated herein.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the subject application.

If the functions are implemented in the form of a software functional unit and is sold or used as an independent product, it can be stored in a computer-readable storage medium. Based on such understanding, the technical solution of the subject application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the subject application. The foregoing storage medium comprises, a USB disk, a removable hard disk, a read-only memory (ROM), a random access memory (RAM), a magnetic disk, an optical disk or any other mediums that can store program codes.

In the embodiments of the apparatuses, methods and systems of the subject application, it is apparent that the members (systems, sub-systems, modules, sub-modules, units, sub-units, and the like) or the steps can be decomposed, combined and/or recombined after decomposition. The decomposition and/or recombination should be regarded as equivalent solutions of the subject application. Moreover, in the description about the embodiments of the subject application, features described and/or illustrated with respect to one implementation may be used in one or more other implementations in the same or a similar manner, be combined with features in other implementations, or replace the features in other implementations.

It should be emphasized that, the term "comprise" used herein refers to existence of features, elements, steps or components, but does not exclude existence or addition of one or more other features, elements, steps or components.

Finally, it should be noted that, the above implementations are only intended to describe the subject application rather than to limit the subject application; various changes and variations can be made by those of ordinary skill in the art without departing from the spirit and scope of the subject application, so all equivalent technical solutions also belong to the category of the subject application, and the scope of patent protection of the subject application should be defined by the claims.

What is claimed is:

1. A light field capture control method, comprising:
   acquiring depth information of a to-be-shot scene;
   determining target pixel density distribution information of an image sensor of a light field camera according to the depth information;
   adjusting pixel density distribution of the image sensor according to the target pixel density distribution information; and
   performing, by the adjusted image sensor, light field capture of the to-be-shot scene,
   wherein determining target pixel density distribution information according to the depth information comprises:
      performing regional division on the to-be-shot scene in a depth of field (DOF) direction according to the depth information; and
      determining the target pixel density distribution information according to a result of the regional division, wherein in the target pixel density distribution information, target pixel density distribution corresponding to at least two different regions divided varies.

2. The light field capture control method of claim 1, wherein in the target pixel density distribution information, average target pixel density corresponding to different regions presents gradual change with a regularity along with an increase of DOF depths of the different regions.

3. The light field capture control method of claim 1, wherein in the target pixel density distribution information, average target pixel density corresponding to a shallower-DOF region is greater than that corresponding to a deeper-DOF region.

4. The light field capture control method of claim 1, wherein the determining the target pixel density distribution information according to a result of the regional division comprises:
   determining distribution information of a sub-lens, which affects light field capture of respective regions in the result of the regional division, in a sub-lens array of the light field camera;
   determining imaging region distribution information of the image sensor corresponding to the distribution information of the sub-lens; and
   determining the target pixel density distribution information according to the imaging region distribution information, wherein in the target pixel density distribution information, target pixel density distribution corresponding to at least two different imaging regions varies.

5. The light field capture control method of claim 1, wherein the determining the target pixel density distribution information according to a result of the regional division comprises:
   determining target view distribution information of light field capture of the to-be-shot scene according to the result of the regional division; and
   determining the target pixel density distribution information according to the target view distribution information.

6. The light field capture control method of claim 5, wherein in the target view distribution information, the number of average target views corresponding to different regions presents gradual change with a regularity along with an increase of DOF depths of the different regions.

7. The light field capture control method of claim 6, wherein in the target view distribution information, the number of average target views corresponding to a shallower-DOF region is greater than that corresponding to a deeper-DOF region.

8. The light field capture control method of claim 5, wherein the determining the target pixel density distribution information according to the target view distribution information comprises:
   determining distribution information of a sub-lens, which affects light field capture of respective regions in the result of the regional division, in a sub-lens array of the light field camera;
   determining imaging region distribution information of the image sensor corresponding to the distribution information of the sub-lens;
   determining imaging sub-region distribution information, corresponding to respective imaging regions and the target view distribution information, in the imaging region distribution information; and determining the target pixel density distribution information according to the imaging sub-region distribution information, wherein in the target pixel density distribution information, target pixel density distribution corresponding to at least two different imaging sub-regions varies.

9. The light field capture control method of claim 1, wherein the adjusting pixel density distribution of the image sensor according to the target pixel density distribution information comprises:
   determining deformation control information of a controllable deformed material portion according to the target pixel density distribution information; and
   controlling the controllable deformed material portion to produce deformation according to the deformation control information, so as to correspondingly adjust the pixel density distribution of the image sensor through the deformation of the controllable deformed material portion.

10. The light field capture control method of claim 9, wherein the controllable deformed material portion is prepared from at least one of the following controllable deformed materials: piezoelectric materials, electroactive polymers, photodeformation materials and magnetostriction materials.

11. A light field capture control apparatus, comprising:
   a scene depth information capture module, configured to acquire depth information of a to-be-shot scene;
   a target pixel density distribution information determination module, configured to determine target pixel density distribution information of an image sensor of a light field camera according to the depth information;
   a pixel density distribution adjustment module, configured to adjust pixel density distribution of the image sensor according to the target pixel density distribution information; and
   a light field capture module, configured to perform light field capture of the to-be-shot scene via the adjusted image sensor,
      wherein the target pixel density distribution information determination module comprises:
      a regional division sub-module, configured to perform regional division on the to-be-shot scene in a depth of field (DOF) direction according to the depth information; and
      a target pixel density distribution information determination sub-module, configured to determine the target pixel density distribution information according to a result of the regional division, wherein in the target pixel density distribution information, target pixel density distribution corresponding to at least two different regions divided varies.

12. The light field capture control apparatus of claim 11, wherein the target pixel density distribution information determination sub-module comprises:
   a sub-lens distribution information determination unit, configured to determine distribution information of a sub-lens, which affects light field capture of respective regions in the result of the regional division, in a sub-lens array of the light field camera;
   an imaging region distribution information determination unit, configured to determine imaging region distribution information of the image sensor corresponding to the distribution information of the sub-lens; and
   a first target pixel density distribution information determination unit, configured to determine the target pixel density distribution information according to the imaging region distribution information, wherein in the target pixel density distribution information, target pixel density distribution corresponding to at least two different imaging regions varies.

13. The light field capture control apparatus of claim 11, wherein the target pixel density distribution information determination sub-module comprises:
   a target view distribution information determination unit, configured to determine target view distribution information of light field capture of the to-be-shot scene according to the result of the regional division; and
   a second target pixel density distribution information determination unit, configured to determine the target pixel density distribution information according to the target view distribution information.

14. The light field capture control apparatus of claim 13, wherein the second target pixel density distribution information determination unit comprises:
   a sub-lens distribution information determination sub-unit, configured to determine distribution information of a sub-lens, which affects light field capture of respective regions in the result of the regional division, in a sub-lens array of the light field camera;
   an imaging region distribution information determination sub-unit, configured to determine imaging region distribution information of the image sensor corresponding to the distribution information of the sub-lens;
   an imaging sub-region distribution information determination sub-unit, configured to determine imaging sub-region distribution information, corresponding to respective imaging regions and the target view distribution information, in the imaging region distribution information; and
   a target pixel density distribution information determination sub-unit, configured to determine the target pixel density distribution information according to the imaging sub-region distribution information, wherein in the target pixel density distribution information, target pixel density distribution corresponding to at least two different imaging sub-regions varies.

15. The light field capture control apparatus of claim 11, wherein the pixel density distribution adjustment module comprises:
   a deformation control information determination sub-module, configured to determine deformation control information of a controllable deformed material portion according to the target pixel density distribution information; and
   a deformation control sub-module, configured to control the controllable deformed material portion to produce deformation according to the deformation control information, so as to correspondingly adjust the pixel density distribution of the image sensor through the deformation of the controllable deformed material portion.

16. The light field capture control apparatus of claim 15, wherein the controllable deformed material portion is prepared from at least one of the following controllable deformed materials: piezoelectric materials, electroactive polymers, photodeformation materials and magnetostriction materials.

17. A light field capture device, comprising a light field capture control apparatus, which comprises:
   a scene depth information capture module, configured to acquire depth information of a to-be-shot scene;
   a target pixel density distribution information determination module, configured to determine target pixel density distribution information of an image sensor of a light field camera according to the depth information;

a pixel density distribution adjustment module, configured to adjust pixel density distribution of the image sensor according to the target pixel density distribution information; and a light field capture module, configured to perform light field capture of the to-be-shot scene via the adjusted image sensor, wherein, the light field capture control apparatus is connected with the light field camera, and wherein the target pixel density distribution information determination module comprises:

a regional division sub-module, configured to perform regional division on the to-be-shot scene in a depth of field (DOF) direction according to the depth information; and a target pixel density distribution information determination sub-module, configured to determine the target pixel density distribution information according to a result of the regional division, wherein in the target pixel density distribution information, target pixel density distribution corresponding to at least two different regions divided varies.

18. The light field capture device of claim 17, wherein the image sensor comprises:

multiple image sensor pixels array-distributed; and a controllable deformed material portion, respectively connected with the multiple image sensor pixels; wherein the controllable deformed material portion can produce deformation under the action of an external field, and correspondingly adjusts density distribution of the multiple image sensor pixels through the deformation; and the external field is controlled by the light field capture control apparatus.

19. A non-transitory computer readable storage apparatus, comprising at least one executable instruction, which, in response to execution, causes a light field capture control method, comprising:

acquiring depth information of a to-be-shot scene;

determining target pixel density distribution information of an image sensor of a light field camera according to the depth information;

adjusting pixel density distribution of the image sensor according to the target pixel density distribution information; and performing, by the adjusted image sensor, light field capture of the to-be-shot scene, wherein determining target pixel density distribution information according to the depth information comprises:

performing regional division on the to-be-shot scene in a depth of field (DOF) direction according to the depth information; and determining the target pixel density distribution information according to a result of the regional division, wherein in the target pixel density distribution information, target pixel density distribution corresponding to at least two different regions divided varies.

20. A light field capture control apparatus, characterized by comprising a processor and a memory, the memory storing computer executable instructions, the processor being connected to the memory through a communication bus, and when the apparatus for controlling task migration operates, the processor executing the computer executable instructions stored in the memory, so that the apparatus for controlling task migration executes operations, comprising:

acquiring depth information of a to-be-shot scene;

determining target pixel density distribution information of an image sensor of a light field camera according to the depth information;

adjusting pixel density distribution of the image sensor according to the target pixel density distribution information; and performing, by the adjusted image sensor, light field capture of the to-be-shot scene, wherein determining target pixel density distribution information according to the depth information comprises:

performing regional division on the to-be-shot scene in a depth of field (DOF) direction according to the depth information; and determining the target pixel density distribution information according to a result of the regional division, wherein in the target pixel density distribution information, target pixel density distribution corresponding to at least two different regions divided varies.

* * * * *